(12) United States Patent
Schowengerdt et al.

(10) Patent No.: US 12,092,817 B2
(45) Date of Patent: *Sep. 17, 2024

(54) SYSTEMS AND METHODS FOR AUGMENTED REALITY

(71) Applicant: MAGIC LEAP, INC., Plantation, FL (US)

(72) Inventors: Brian T. Schowengerdt, Seattle, WA (US); Mathew D. Watson, Bellevue, WA (US)

(73) Assignee: Magic Leap, Inc., Plantation, FL (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/318,061

(22) Filed: May 12, 2021

(65) Prior Publication Data

US 2021/0271080 A1    Sep. 2, 2021

Related U.S. Application Data

(63) Continuation of application No. 15/479,700, filed on Apr. 5, 2017, now Pat. No. 11,067,797.

(Continued)

(51) Int. Cl.
*G02B 27/01* (2006.01)
*G02B 30/52* (2020.01)

(52) U.S. Cl.
CPC ..... *G02B 27/0101* (2013.01); *G02B 27/0103* (2013.01); *G02B 30/52* (2020.01); *G02B 2027/012* (2013.01); *G02B 2027/0194* (2013.01)

(58) Field of Classification Search
CPC .. G02B 27/01; G02B 27/101; G02B 27/0103; G02B 27/0114; G02B 27/017; G02B 27/0172
See application file for complete search history.

(56) References Cited

U.S. PATENT DOCUMENTS 5,751,494 A    5/1998    Takahashi
5,889,567 A    3/1999    Swanson et al.
(Continued)

FOREIGN PATENT DOCUMENTS

AU    2017246864 B2    10/2017
AU    2015266670       5/2019
(Continued)

OTHER PUBLICATIONS

Foreign Notice of Acceptance for AU Patent Appln. No. 2017246864 dated Apr. 4, 2022.

(Continued)

*Primary Examiner* — Christopher Stanford
*Assistant Examiner* — Journey F Sumlar
(74) *Attorney, Agent, or Firm* — Vista IP Law Group, LLP

(57) ABSTRACT

An augmented reality system includes a light source configured to generate a virtual light beam. The system also includes a light guiding optical element having an entry portion, an exit portion, and a surface having a diverter disposed adjacent thereto. The light source and the light guiding optical element are configured such that the virtual light beam enters the light guiding optical element through the entry portion, propagates through the light guiding optical element by at least partially reflecting off of the surface, and exits the light guiding optical element through the exit portion. The light guiding optical element is transparent to a first real-world light beam. The diverter is configured to modify a light path of a second real-world light beam at the surface.

19 Claims, 8 Drawing Sheets

Related U.S. Application Data

(60) Provisional application No. 62/319,566, filed on Apr. 7, 2016.

(56) References Cited

U.S. PATENT DOCUMENTS

| | | | |
|---|---|---|---|
| 6,120,538 | A | 9/2000 | Rizzo, III et al. |
| 6,215,928 | B1 | 4/2001 | Friesem et al. |
| 7,077,523 | B2 | 7/2006 | Seo et al. |
| 7,428,001 | B2 | 9/2008 | Schowengerdt et al. |
| 7,616,382 | B2 | 11/2009 | Inoguchi et al. |
| 8,248,458 | B2 | 8/2012 | Schowengerdt et al. |
| 8,259,164 | B2 | 9/2012 | Saito et al. |
| 8,317,330 | B2 | 11/2012 | Yamazaki et al. |
| 8,384,999 | B1 | 2/2013 | Crosby et al. |
| 9,740,006 | B2 | 8/2017 | Gao |
| 9,791,700 | B2 | 10/2017 | Schowengerdt |
| 9,915,826 | B2 | 3/2018 | Tekolste et al. |
| 10,156,722 | B2 | 12/2018 | Gao et al. |
| 10,466,486 | B2 | 11/2019 | Tekolste et al. |
| 2004/0109234 | A1 | 6/2004 | Levola |
| 2004/0227703 | A1 | 11/2004 | Lamvik et al. |
| 2006/0012851 | A1 | 1/2006 | Wu et al. |
| 2008/0018555 | A1* | 1/2008 | Kuo ..................... G02B 17/006 345/8 |
| 2009/0129116 | A1 | 5/2009 | Kim et al. |
| 2010/0039707 | A1 | 2/2010 | Akahane et al. |
| 2010/0289970 | A1 | 11/2010 | Watanabe |
| 2011/0051226 | A1 | 3/2011 | Vallius et al. |
| 2011/0075257 | A1 | 3/2011 | Hua et al. |
| 2011/0109823 | A1 | 5/2011 | Galstian et al. |
| 2012/0081800 | A1 | 4/2012 | Cheng et al. |
| 2012/0162549 | A1 | 6/2012 | Gao et al. |
| 2012/0192991 | A1 | 8/2012 | Gupta et al. |
| 2013/0022222 | A1 | 1/2013 | Zschau et al. |
| 2013/0050832 | A1 | 2/2013 | Tohara et al. |
| 2013/0082905 | A1 | 4/2013 | Ranieri et al. |
| 2013/0135299 | A1 | 5/2013 | Park et al. |
| 2013/0187836 | A1 | 7/2013 | Cheng et al. |
| 2013/0250430 | A1 | 9/2013 | Robbins et al. |
| 2013/0300635 | A1 | 11/2013 | White et al. |
| 2013/0314793 | A1 | 11/2013 | Robbins et al. |
| 2014/0009845 | A1 | 1/2014 | Cheng et al. |
| 2014/0071539 | A1 | 3/2014 | Gao |
| 2014/0232651 | A1 | 8/2014 | Kress et al. |
| 2014/0266986 | A1 | 9/2014 | Magyari |
| 2014/0266990 | A1 | 9/2014 | Makino et al. |
| 2014/0300966 | A1 | 10/2014 | Travers et al. |
| 2014/0327771 | A1 | 11/2014 | Malachowsky et al. |
| 2014/0340389 | A1 | 11/2014 | Lanman et al. |
| 2015/0016777 | A1 | 1/2015 | Abovitz et al. |
| 2015/0062345 | A1 | 3/2015 | Kusanagi |
| 2015/0116721 | A1 | 4/2015 | Kats et al. |
| 2015/0130995 | A1 | 5/2015 | Nishiyama et al. |
| 2015/0205126 | A1 | 7/2015 | Schowengerdt |
| 2015/0219842 | A1 | 8/2015 | Sqalli et al. |
| 2015/0234191 | A1 | 8/2015 | Schowengerdt |
| 2015/0234205 | A1 | 8/2015 | Schowengerdt |
| 2015/0248012 | A1 | 9/2015 | Schowengerdt |
| 2015/0260992 | A1 | 9/2015 | Luttmann et al. |
| 2015/0268467 | A1 | 9/2015 | Cakmakci et al. |
| 2015/0277129 | A1 | 10/2015 | Hua et al. |
| 2015/0309263 | A2 | 10/2015 | Abovitz et al. |
| 2015/0319430 | A1 | 11/2015 | Lapstun |
| 2015/0346490 | A1 | 12/2015 | Tekolste et al. |
| 2015/0346495 | A1 | 12/2015 | Welch et al. |
| 2016/0011419 | A1 | 1/2016 | Gao |
| 2016/0139402 | A1 | 5/2016 | Lapstun |
| 2017/0160548 | A1 | 6/2017 | Woltman |
| 2017/0293141 | A1 | 10/2017 | Schowengerdt et al. |
| 2018/0172998 | A1 | 6/2018 | Tekolste et al. |
| 2019/0018247 | A1 | 1/2019 | Gao et al. |
| 2020/0176714 | A1 | 6/2020 | Fusella et al. |

FOREIGN PATENT DOCUMENTS

| | | |
|---|---|---|
| AU | 2021250895 B2 | 10/2023 |
| CN | 104360484 | 2/2015 |
| DE | 10 2007 021036 | 11/2008 |
| JP | 2002-116410 | 4/2002 |
| JP | 2002-196280 | 7/2002 |
| JP | 2004-252429 | 9/2004 |
| JP | 2006-3872 | 1/2006 |
| JP | 2007-505352 | 3/2007 |
| JP | 2007-101790 | 4/2007 |
| JP | 2009-169142 | 7/2009 |
| JP | 2009-186794 | 8/2009 |
| JP | 2010-039219 | 2/2010 |
| JP | 2010-139621 | 6/2010 |
| JP | 2010-204397 | 9/2010 |
| JP | 2011-077764 | 4/2011 |
| JP | 2014-505381 | 2/2014 |
| JP | 2014-092696 | 5/2014 |
| JP | 2014-132328 | 7/2014 |
| JP | 2014-222302 | 11/2014 |
| WO | WO 02/086590 | 10/2002 |
| WO | WO 2005/024491 | 3/2005 |
| WO | WO 2008071830 | 6/2008 |
| WO | WO 2011134169 | 11/2011 |
| WO | WO 2013/049248 | 4/2013 |
| WO | WO 2013/162977 | 10/2013 |
| WO | WO 2014053194 | 4/2014 |
| WO | WO 2014062912 | 4/2014 |
| WO | WO 2014064228 | 5/2014 |
| WO | WO 2015184409 | 12/2015 |
| WO | WO 2017176861 | 10/2017 |

OTHER PUBLICATIONS

Foreign NOA for CN Patent Appln. No. 202010626648.5 dated Apr. 15, 2022.
Final Office Action for U.S. Appl. No. 16/123,711 dated Feb. 8, 2022.
Foreign Exam Report for EP Patent Appln. No. 17779729.7 dated Feb. 2, 2022.
Foreign FOA for KR Patent Appln. No. 10-2018-7032129 dated Feb. 8, 2022 (English Traslation).
Foreign NOA for KR Patent Appln. No. 10-2018-7032129 dated Feb. 8, 2022.
Foreign Response for KR Patent Appln. No. 10-2021-7023212 dated Feb. 8, 2022.
Foreign NOA for KR Patent Appln. No. 10-2021-7023212 dated Feb. 14, 2022.
Foreign Response for JP Patent Appln. No. 2021-7792 dated Feb. 17, 2022.
Foreign NOA for JP Patent Appln. No. 2018-552061 dated Mar. 8, 2022.
Foreign Response for AU Patent Appln. No. 2020204550 Jun. 25, 2021.
Foreign Response for IL Patent Appln. No. 274429 dated Jun. 29, 2021.
Foreign Response for CN Patent Appln. No. 201780021552.2 dated Jul. 16, 2021.
Foreign Response for IN Patent Appln. No. 201847038959 dated Jul. 21, 2021.
Foreign Response for CN Patent Appln. No. 202010626647.0 dated Sep. 1, 2021.
Foreign NOA for CA Patent Appln. No. 2950425 dated Aug. 20, 2021.
Non-Final Office Action for U.S. Appl. No. 16/123,711 dated Sep. 14, 2021.
Foreign Exam Report for EP Patent Appln. No. 15799569.7 dated Sep. 10, 2021.
Foreign FOA for JP Patent Appln. No. 2018-552061 dated Sep. 15, 2021 with English translation.
Foreign OA for KR Patent Appln. No. 10-2018-7032129 dated Oct. 20, 2021.
Foreign OA for CN Patent Appln. No. 202010626647.0 dated Nov. 3, 2021.

(56) References Cited

OTHER PUBLICATIONS

Foreign OA for CN Patent Appln. No. 202010626648.5 dated Nov. 1, 2021.
Amendment Response to NFOA for U.S. Appl. No. 16/123,711 dated Dec. 7, 2021.
Foreign Response for AU Patent Appln. No. 2017246864 dated Dec. 10, 2021.
Foreign OA for KR Patent Appln. No. 10-2021-7023212 dated Dec. 10, 2021.
Foreign OA for JP Patent Appln. No. 2021-007792 dated Dec. 2, 2021.
Foreign Response for KR Patent Appln. No. 10-2018-7032129 dated Dec. 16, 2021.
Foreign Notice of Appeal with Response for JP Patent Appln. No. 2018-552061 dated Dec. 21, 2021.
Foreign OA for JP Patent Appln. No. 2021-5068 dated Dec. 14, 2021.
Foreign Response and Written Submission for IN Patent Appln. No. 201747028773 dated Dec. 30, 2021.
Foreign Response for CN Patent Appln. No. 202010626647.0 dated Jan. 6, 2022.
Foreign Response for EP Patent Appln. No. 15799569.7 dated Jan. 18, 2022.
Foreign Exam Report for AU Patent Appln. No. 2017246864 dated Jan. 11, 2022.
Foreign OA for IL Patent Appln. No. 261829 dated Dec. 12, 2021.
Foreign Exam Report for CA Patent Appln. No. 2975234 dated Jan. 18, 2022.
Foreign Response for EP Patent Appln. No. 17779729.7 dated Jun. 7, 2022.
Foreign Response for EP Patent Appln. No. 16743992.6 dated Jun. 15, 2022.
Notice of Allowance for U.S. Appl. No. 17/209,426 dated Jun. 27, 2022.
Foreign OA for JP Patent Appln. No. 2021-7792 dated Jun. 6, 2022 with English translation.
Foreign FOA for JP Patent Appln. No. 2021-5068 dated Jun. 22, 2022 with English translation.
Foreign Exam Report for CA Patent Appln. No. 2975234 dated Jul. 26, 2022.
Foreign Response for IL Patent Appln. No. 261829 dated Aug. 14, 2022.
Foreign Notification Prior to Acceptance for IL Patent Appln. No. 285033 dated Aug. 2, 2022.
Foreign Response for CA Patent Appln. No. 2975234 dated Nov. 18, 2022.
Foreign Exam Report for AU Patent Appln. No. 2021250895 dated Nov. 3, 2022.
Foreign NOA for CN Patent Appln. No. 202010626647.0 dated Feb. 23, 2022.
Foreign Response for CN Patent Appln. No. 202010626648.5 dated Mar. 9, 2022.
Foreign Exam Report for EP Patent Appln. No. 16743992.6 dated Feb. 17, 2022.
Foreign Response for JP Patent Appln. No. 2021-5068 dated Mar. 11, 2022.
Foreign Response for KR Patent Appln. No. 10-2018-7032129 dated Mar. 10, 2022.
Foreign Response for AU Patent Appln. No. 2017246864 dated Mar. 24, 2022.
Foreign NOA for IL patent Appln. No. 274429 dated Feb. 16, 2022.
Foreign FOA for JP Patent Appln. No. 2021-7792 dated Dec. 7, 2022 (with English translation).
Foreign Response for NZ Patent Appln. No. 746486 dated Nov. 10, 2022.
Amendment Response to FOA for U.S. Appln. No. 16/123,711 dated May 6, 2022.
Foreign Response for CA Patent Appln. No. 2975234 dated May 18, 2022.
Foreign Exam Report for NZ Patent Appln. No. 746486 dated May 10, 2022.
Notice of Allowance for U.S. Appl. No. 16/123,711 dated May 27, 2022.
Foreign NOA for IL Patent Appln. No. 261829 dated Aug. 31, 2022.
Hua, et al. "An Optical See-through Multi-Focal-Plane Stereoscopic Display Prototype Enabling Nearly-Correct Focus Cues," Stereoscopic Displays and Applications XXIV, Proc. of SPIE-IS&T Electronic Imaging, SPIE vol. 8648, 86481A, Mar. 12, 2013. doi: 10.1117/12.2005117.
Hu, Xinda. "Development of the Depth-Fused Multi-Focal-Plane Display Technology," The University of Arizona, 2014.
Cheng, et al. "Design of a wide-angle, lightweight head-mounted display using free-form optics tiling," Optics Letters, vol. 36, No. 11, Jun. 1, 2011,2098-2100.
Cheng, et al. "Light field head-mounted display with correct focus cue using micro structure array," Chinese Optics Letters, 12(6), Jun. 10, 2014, 060010.
Hu, et al. "High-resolution optical see-through multi-focal-plane head-mounted display using freeform optics," Optics Express, 22 (11), Jun. 2, 2014, 13896-13903. DOI: 10.1364/0E.22.013896.
Hu, et al. "A depth-fused multi-focal-plane display prototype enabling focus cues in stereoscopic displays," SID 11 Digest, 2011, 691-694.
Hu, et al. "Design of an optical see-through multi-focal-plane stereoscopic 3D display using freeform prisms," FiO/LS Technical Digest, 2012.
Hu, et al. "Design and assessment of a depth fused multi-focal-plane display prototype," Journal of display technology, 10 (4), Apr. 2014, 308-316.
PCT International Search Report and Written Opinion for International Appln. No. PCT/US15/33412, Applicant Magic Leap, Inc., forms PCT/ISA/210, 220, and 237, dated Oct. 26, 2015 (13 pages).
Non-Final Office Action for U.S. Appl. No. 14/726,396 dated Mar. 15, 2017.
Final Office Action for U.S. Appl. No. 14/726,396 dated Aug. 16, 2017.
Restriction Requirement for U.S. Appl. No. 14/726,396 dated Sep. 1, 2017.
Response to Non-Final Office Action dated Jun. 15, 2017 for U.S. Appl. No. 14/726,396.
Response to Restriction Election dated Feb. 21, 2017 for U.S. Appl. No. 14/726,396.
PCT International Search Report and Written Opinion for International Appln. No. PCT/US2017/26102, Applicant Magic Leap, Inc., forms PCT/ISA/210, 220, and 237, dated Jun. 26, 2017 (9 pages).
PCT International Search Report and Written Opinion of the ISA (corrected version) mailed Apr. 21, 2016, for PCT/US2016/14988, Applicant Magic Leap, Inc., dated Apr. 8, 2016 (13 pages).
Notice of Allowance for U.S. Appl. No. 15/007,117 dated Oct. 19, 2017.
Non-Final Office Action for U.S. Appl. No. 15/007,117 dated Apr. 6, 2017.
Response to Non-Final Office Action dated Jun. 30, 2017 for U.S. Appl. No. 15/007,117.
Response to Final Office Action filed Nov. 16, 2017 for U.S. Appl. No. 14/726,396.
Non-Final Office Action for U.S. Appl. No. 14/726,396 dated Dec. 21, 2017.
Extended European Search Report mailed Jan. 18, 2018 for EP application No. 15799569.7, Applicant Magic Leap, Inc. 6 pages.
Amendment after Non-Final Office Action for U.S. Appl. No. 14/726,396 dated Mar. 21, 2018.
Non-Final Office Action mailed Mar. 27, 2018 for U.S. Appl. No. 15/479,700.
Amendment after Non-Final Office Action for U.S. Appl. No. 15/479,700 dated Jun. 27, 2018.
Notice of Allowance for U.S. Appl. No. 14/726,396 dated Jul. 2, 2018.
Notice of Allowance for U.S. Appl. No. 15/896,438 dated Jul. 31, 2018.
Response to Extended European Search Report filed Aug. 14, 2018 for EP application No. 15799569.7, Applicant Magic Leap, Inc. 11 pages.

(56) References Cited

OTHER PUBLICATIONS

Extended European Search Report dated Aug. 23, 2018 for EP application No. 16743992.6, Applicant Magic Leap, Inc. 8 pages.
Machine generated translation of Foreign Patent No. DE 10 2007 02136, granted Nov. 6, 2008, translation prepared Aug. 21, 2018, 21 pages.
Notice of Allowance for U.S. Appl. No. 14/726,396 dated Sep. 28, 2018.
Non-Final Office Action for U.S. Appl. No. 15/896,438 dated Nov. 2, 2018.
Final Office Action for U.S. Appl. No. 15/479,700 dated Nov. 2, 2018.
Office action mailed Sep. 7, 2018 for AU Application No. 2015266670.
Office action mailed Feb. 2, 2018 for Chinese Application No. 201580041059.8, in Chinese with English Translation from foreign associate.
Response to Office Action filed Jun. 13, 2018 for Chinese application No. 201580041059.8, in Chinese language with claims in English.
Office action dated Oct. 15, 2018 for Chinese application No. 201580041059.8, in Chinese language with a translation provided by the foreign associate.
Response to 2nd Office Action filed Dec. 25, 2018 for Chinese application No. 201580041059.8, in Chinese language.
RCE and Response to Office Action for U.S. Appl. No. 15/479,700, filed Feb. 4, 2019.
Office action dated Jan. 15, 2019 for Israeli application No. 249091, in Israeli language with translation provided by foreign associate.
Non-Final Office Action dated Feb. 19, 2019 for U.S. Appl. No. 15/479,700.
Response to Office Action filed Mar. 4, 2019 for U.S. Appl. No. 15/896,438.
Response to Extended European Search Report filed Mar. 18, 2019 for European Patent Application No. 16743992.6, Applicant Magic Leap, Inc. 12 pages.
Response to Examination Report filed Mar. 22, 2019 for Australian application No. 2015266670.
Extended European Search Report dated Mar. 26, 2019 for European Application No. 17779729.7, Applicant Magic Leap, Inc. 10 pages.
Office Action mailed Apr. 1, 2019 for Japanese Application No. 2016-570034 with English Translation from foreign associate.
Notice of Acceptance dated Apr. 26, 2019 for AU Appln.No. 2015266670.
Response to OA filed May 13, 2019, for Israeli application No. 249091, in Israeli language with translation provided by foreign associate.
Response to Office Action for U.S. Appl. No. 15/479,700, filed May 20, 2019.
Response to 1st Office Action filed Jun. 11, 2019 for Japanese application No. 2016-570034, in Japanese language only.
Office action dated Jun. 4, 2019 for Chinese application No. 201580041059.8, in Chinese language with a translation provided by the foreign associate.
Response to OA filed Aug. 14, 2019 for Chinese Patent Application No. 201580041059.8, in Chinese language only with translation of amended claims in English, 80 pages.
Office Action mailed Aug. 1, 2019 for Japanese Application No. 2016-570034, in Japanese with English Translation from foreign associate, 4 pages.
Final Office Action dated Sep. 6, 2019 for U.S. Appl. No. 15/479,700.
Examination Report for New Zealand Application No. 727361 dated Sep. 13, 2019, 3 pages.
Office action dated Aug. 15, 2019, for Chinese application No. 201680018144.7, in Chinese language with an English translation provided by the foreign associate, (11 pages).
Response to Extended European Search Report filed Oct. 21, 2019 for European application No. 17779729.7, Applicant Magic Leap, Inc. (9 pages).
Examination Report for New Zealand Application No. 734573 dated Nov. 14, 2019, 2 pages.
Response to Office action filed Dec. 13, 2019, for Chinese application No. 201680018144.7, in Chinese language No. English translation, (4 pages).
Office Action mailed Dec. 13, 2019 for Japanese Application No. 2017-539020, in Japanese with English Translation from foreign associate, 8 pages.
Office action dated Dec. 12, 2019 for Chinese application No. 201580041059.8, in Chinese language with a translation provided by the foreign associate, 8 pages.
Notice of Allowance for Japanese Appln. No. 2016-570034 dated Jan. 8, 2020.
Examination Report for Australian Application No. 2016211623 dated Jan. 3, 2020, 2 pages.
Non-Final Office Action mailed Mar. 6, 2020 for U.S. Appl. No. 15/479,700.
Foreign Office Action for Chinese Patent Appln. No. 201780021552.2 dated Feb. 6, 2020.
Response to First Examination Report for New Zealand Application No. 727361 dated Mar. 9, 2020.
Notice of Allowance for U.S. Appl. No. 16/573,120 dated Apr. 15, 2020.
Amendment Response for U.S. Appl. No. 15/479,700 dated Jul. 2, 2020.
Foreign Office Action for Korean Patent Appln. No. 10-2016-7036875 dated Jul. 20, 2020.
Foreign Examiner's Report for AU Patent Appln. No. 2020204550 dated Jul. 13, 2020.
Foreign Office Action for CN Patent Appln. No. 201780021552.2 dated Jul. 15, 2020.
Foreign Office Action for JP Patent Application No. 2020-132801 dated Sep. 9, 2020.
Foreign OA Response for KR Patent Appln. No. 10-2016-7036875 dated Sep. 18, 2020.
Foreign Office Action for JP Patent Application No. 2019-108514 dated Sep. 2, 2020.
Foreign OA Response for CN Patent Appln. No. 201780021552.2 dated Sep. 27, 2020.
Final Office Action for U.S. Appl. No. 15/479,700 dated Oct. 27, 2020.
Foreign OA Response for JP Patent Application No. 2019-108514 dated Nov. 25, 2020.
Non-Final Office Action for U.S. Appl. No. 16/123,711 dated Nov. 25, 2020.
Foreign OA Response for JP Patent Application No. 2020-132801 dated Dec. 1, 2020.
Foreign Notice of Allowance for JP Patent Appln. No. 2020-132801 dated Dec. 18, 2020.
Foreign Notice of Allowance for JP Patent Appln. No. 2019-108514 dated Dec. 28, 2020.
Notice of Allowance for U.S. Appl. No. 16/868,826 dated Dec. 24, 2020.
Foreign OA for CN Patent Appln. No. 201780021552.2 dated Dec. 11, 2020.
Foreign OA for IN Patent Appln. No. 201847038959 dated Jan. 29, 2021.
Notice of Allowance for U.S. Appl. No. 15/479,700 dated Feb. 12, 2021.
Foreign OA for KR Patent Appln. No. 10-2017-7023982 dated Feb. 19, 2021.
Foreign Response for CN Patent Appln. No. 201780021552.2 dated Feb. 22, 2021.
Amendment Response for U.S. Appl. No. 16/123,711 dated Feb. 25, 2021.
Foreign Exam Report for CA Patent Appln. No. 2950425 dated Feb. 9, 2021.
Foreign Office Action for IL Patent Appln. No. 253732 dated Dec. 21, 2020.
Foreign OA for JP Patent Appln. No. 2018-552061 dated Mar. 3, 2021.
Foreign Response for NZ Patent Appln. No. 762952 dated Mar. 26, 2021.

(56) References Cited

OTHER PUBLICATIONS

Foreign Response for NZ Patent Appln. No. 762432 dated Apr. 1, 2021.
Foreign Resonse for AU Patent Appln. No. 2019213313 dated Apr. 12, 2021.
Foreign Response for KR Patent Appln. No. 10-2017-7023982 dated Apr. 12, 2021.
Foreign Response for IL Patent Appln. No. 253732 dated Apr. 20, 2021.
Foreign 2nd Exam Report for NZ Patent Appln. No. 762952 dated Mar. 30, 2021.
Final Office Action for U.S. Appl. No. 16/123,711 dated Apr. 23, 2021.
Foreign NOA for IL Patent Appln. No. 253732 dated Apr. 27, 2021.
Foreign NOA for KR Patent Appln. No. 10-2017-7023982 dated Apr. 21, 2021.
Foreign Decision of Rejection for CN Patent Appln. No. 201780021552.2 dated Apr. 1, 2021.
Foreign Response for CA Patent Appln. No. 2950425 dated May 14, 2021.
Foreign OA for IN Patent Appln. No. 201747028773 dated Dec. 30, 2020.
Foreign Exam Report for AU Patent Appln. No. 2017246864 dated May 14, 2021.
Foreign Response for JP Patent Appln. No. 2018-552061 dated May 25, 2021.
Foreign OA for CN Patent Appln. No. 202010626647.0 dated Apr. 16, 2021.
Notice of Allowance for U.S. Appl. No. 16/868,826 dated Oct. 9, 2020.
Foreign Office Action for JP Patent Appln. No. 2019-65723 dated Sep. 28, 2020.
Foreign Notice of Allowance for KR Patent Appln. No. 10-2016-7036875 dated Oct. 14, 2020.
Foreign 1st Exam Report for NZ Patent Appln. No. 762952 dated Oct. 1, 2020.
1st Patent Exam Report for NZ Patent Appln. No. 762432 dated Sep. 4, 2020.
First Exam Report for AU Patent Appln. No. 2019213313 dated Sep. 8, 2020.
Foreign Exam Report for CA Patent Appln. No. 3141963 dated Jan. 17, 2022.
Foreign Notice of Reexamination for CN Patent Appln. No. 201780021552.2 dated Feb. 3, 2023 (with English translation).
Foreign NOA for CA Patent Appln. No. 2975234 dated Feb. 6, 2023.
Foreign NOA for IL Patent Appln. No. 297803 dated Mar. 16, 2023 in English.
Foreign NOA for JP Patent Appln. No. 2021-7792 dated May 19, 2023.
Foreign Examiner's Report for CA Patent Appln. No. 3201563 dated Aug. 11, 2023.
Foreign Exam Report for AU Patent Appln. No. 2021250895 dated Sep. 7, 2023.
Foreign Exam Report for EP Patent Appln. No. 15799569.7 dated Apr. 21, 2023.
Foreign OA for KR Patent Appln. No. 10-2022-7016215 dated May 18, 2023.
Foreign Response for KR Patent Appln. No. 10-2022-7016215 dated Jul. 6, 2023.
Foreign OA for JP Patent Appln. No. 2023-61318 dated Dec. 28, 2023.
Foreign NOA for CA Patent Appln. No. 3201563 dated Jan. 11, 2014.
Foreign NOA for EP Patent Appln. No. 16743992.6 dated Dec. 8, 2023.
Foreign NOA for EP Patent Appln. No. 17779729.7 dated ML-0313EP dated Jan. 15, 2024.
Foreign OA for JP Patent Appln. No. 2021-5068 dated Sep. 8, 2023 (with English translation).
Foreign OA for JP Patent Appln. No. 2022-169020 dated Sep. 28, 2023.
Foreign NOA for AU Patent Appln. No. 2021250895 dated Oct. 6, 2023.
Foreign Response to EP Patent Appln. No. 15799569.7 dated Nov. 2, 2023.
Non-Final Office Action for U.S. Appl. No. 18/047,210 dated Nov. 9, 2023.
Foreign OA for KR Patent Appln. No. 10-2022-7016215 dated Nov. 8, 2023.
Foreign NOA for IL Patent Appln. No. 303820 dated Nov. 6, 2023 in English.
Foreign Response for JP Patent Appln. No. 2021-5068 dated Nov. 20, 2023.
Foreign Response for CA Patent Appln. No. 3201563 dated Dec. 7, 2023.
Foreign Exam Report for CA Patent Appln. No. 3018782 dated Dec. 13, 2023.
Foreign Response for KR Patent Appln. No. 10-2022-7016215 dated Jan. 4, 2024.
Foreign NOA for EP Patent Appln. No. 15799569.7 dated Mar. 4, 2024.
Foreign OA for JP Patent Appln. No. 2021-5068 dated Feb. 29, 2024 (with English translation).
Foreign Response for JP Patent Appln. No. 2023-61318 dated Mar. 25, 2024.
Foreign OA for JP Patent Appln. No. 2022-169020 dated Apr. 10, 2024.
Foreign OA for JP Patent Appln. No. 2022-169020 dated Mar. 27, 2024.
Foreign Response for CA Patent Appln. No. 3018782 dated Apr. 5, 2024.
Notice of Allowance for U.S. Appl. No. 18/047,210 dated May 24, 2024.
Foreign OA for JP Patent Appln. No. 2023-61318 dated May 21, 2024 (with English translation).
Foreign Response for JP Patent Appln. No. 2021-5068 dated Jun. 3, 2024.
Non-Final Office Action for U.S. Appl. No. 17/893,343 dated Jun. 21, 2024.
Extended European Search Report for EP Patent Appln. No. 24165265.0 dated Jun. 26, 2024.
Foreign NOA for KR Patent Appln. No. 10-2022-7016215 dated Jun. 18, 2024.
Foreign NOA for JP Patent Appln. No. 2021-5068 dated Jul. 9, 2024.

* cited by examiner

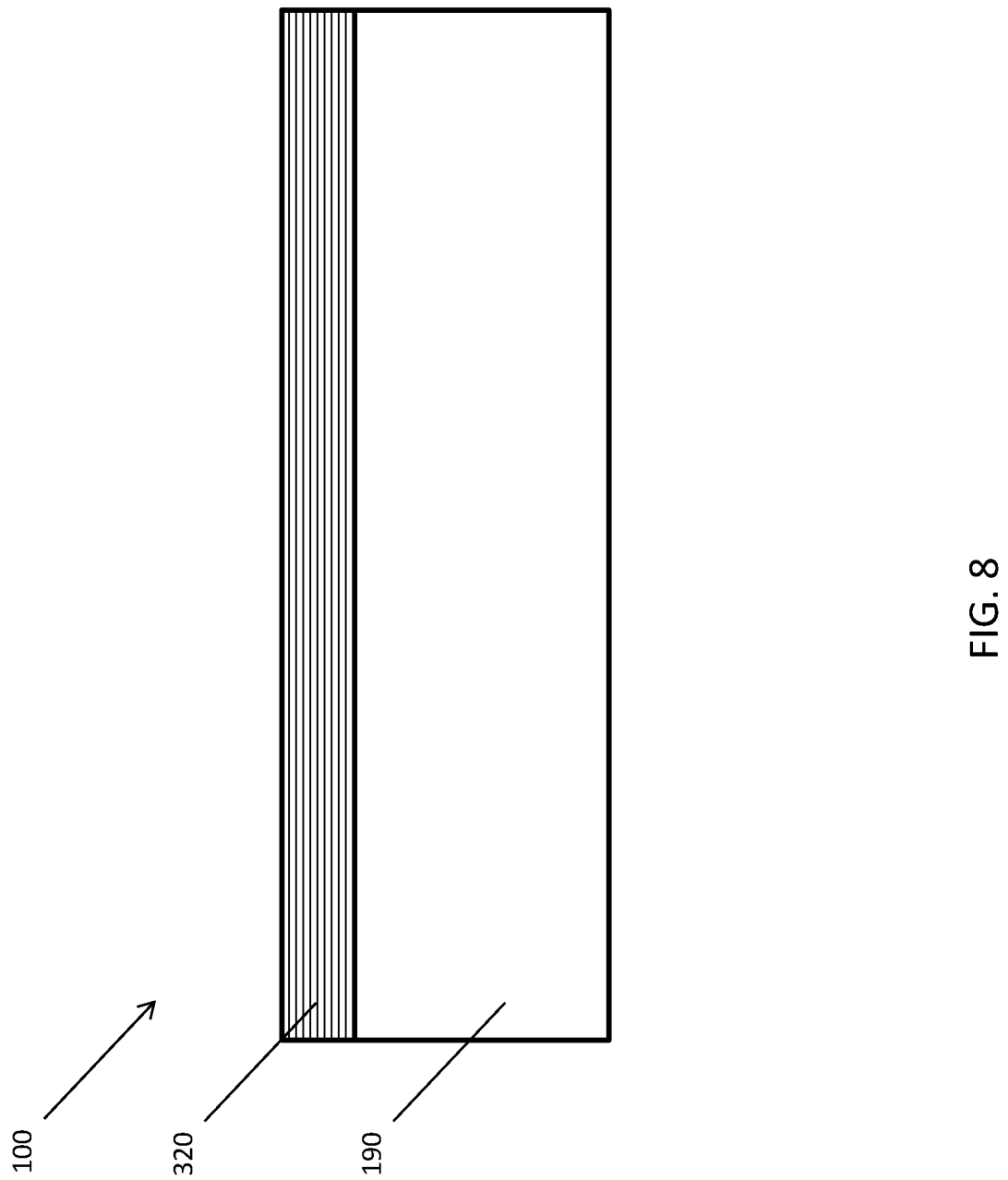

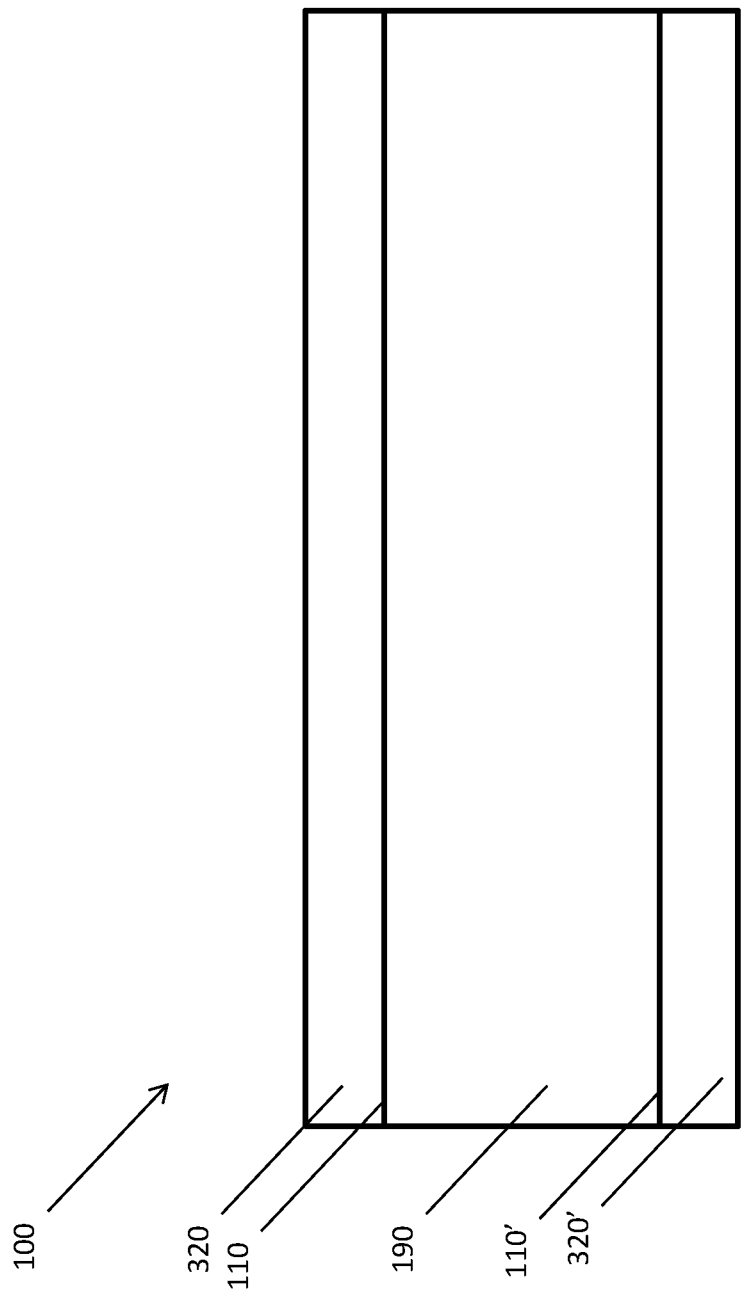

SYSTEMS AND METHODS FOR AUGMENTED REALITY

CROSS-REFERENCE TO RELATED APPLICATION(S)

This application is a continuation of U.S. patent application Ser. No. 15/479,700, filed on Apr. 5, 2017 and entitled "SYSTEMS AND METHODS FOR AUGMENTED REALITY," which claims priority to U.S. Provisional Application Ser. No. 62/319,566, filed on Apr. 7, 2016 entitled "SYSTEMS AND METHODS FOR AUGMENTED REALITY." This application is related to U.S. Utility patent application Ser. No. 14/331,218 filed on Jul. 14, 2014 entitled "PLANAR WAVEGUIDE APPARATUS WITH DIFFRACTION ELEMENT(S) AND SYSTEM EMPLOYING SAME," U.S. Utility patent application Ser. No. 14/555,585 filed on Nov. 27, 2014 entitled "VIRTUAL AND AUGMENTED REALITY SYSTEMS AND METHODS," U.S. Utility patent application Ser. No. 14/726,424 filed on May 29, 2015 entitled "METHODS AND SYSTEMS FOR VIRTUAL AND AUGMENTED REALITY," U.S. Utility patent application Ser. No. 14/726,429 filed on May 29, 2015 entitled "METHODS AND SYSTEMS FOR CREATING FOCAL PLANES IN VIRTUAL AND AUGMENTED REALITY," and U.S. Utility patent application Ser. No. 14/726,396 filed under on May 29, 2015 entitled "METHODS AND SYSTEMS FOR DISPLAYING STEREOSCOPY WITH A FREEFORM OPTICAL SYSTEM WITH ADDRESSABLE FOCUS FOR VIRTUAL AND AUGMENTED REALITY." The contents of the aforementioned patent applications are hereby expressly and fully incorporated by reference in their entirety, as though set forth in full.

BACKGROUND

Modern computing and display technologies have facilitated the development of systems for so called "augmented reality" experiences, wherein digitally reproduced images or portions thereof are presented to a user in a manner wherein they seem to be, or may be perceived as, real. An augmented reality, or "AR", scenario typically involves presentation of digital or virtual image information as an augmentation to visualization of the actual world around the user (i.e., transparency to other actual real-world visual input). Accordingly, AR scenarios involve presentation of digital or virtual image information with transparency to other actual real-world visual input. The human visual perception system is very complex, and producing an AR technology that facilitates a comfortable, natural-feeling, rich presentation of virtual image elements amongst other virtual or real-world imagery elements is challenging.

The visualization center of the brain gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic AR configurations, is known to produce eye fatigue, headaches, or other forms of discomfort in users.

Stereoscopic wearable glasses generally feature two displays for the left and right eyes that are configured to display images with slightly different element presentation such that a three-dimensional perspective is perceived by the human visual system. Such configurations have been found to be uncomfortable for many users due to a mismatch between vergence and accommodation ("vergence-accommodation conflict") which must be overcome to perceive the images in three dimensions. Indeed, some AR users are not able to tolerate stereoscopic configurations. Accordingly, most conventional AR systems are not optimally suited for presenting a rich, binocular, three-dimensional experience in a manner that will be comfortable and maximally useful to the user, in part because prior systems fail to address some of the fundamental aspects of the human perception system, including the vergence-accommodation conflict.

AR systems must also be capable of displaying virtual digital content at various perceived positions and distances relative to the user. The design of AR systems also presents numerous other challenges, including the speed of the system in delivering virtual digital content, quality of virtual digital content, eye relief of the user (addressing the vergence-accommodation conflict), size and portability of the system, and other system and optical challenges.

One possible approach to address these problems (including the vergence-accommodation conflict) is to project images at multiple depth planes. To implement this type of system, one approach is to use a plurality of light-guiding optical elements to direct light at the eyes of a user such that the light appears to originate from multiple depth planes. The light-guiding optical elements are designed to in-couple virtual light corresponding to digital or virtual objects and propagate it by total internal reflection ("TIR"), then to out-couple the virtual light to display the digital or virtual objects to the user's eyes. The light-guiding optical elements are also designed be transparent to light from (e.g., reflecting off of) actual real-world objects. Therefore, portions of the light-guiding optical elements are designed to reflect virtual light for propagation via TIR while being transparent to real-world light from real-world objects.

However, some real-world light can be in-coupled into the light-guiding optical element and out-couple in an uncontrolled manner, resulting in an unintended image of a real-world object being presented to the user's eyes. The appearance of unintended images of real-world objects in an AR scenario can disrupt the intended effect of the AR scenario. The appearance of unintended images in random locations in the field of view can also result in discomfort from vergence-accommodation conflict. The systems and methods described herein are configured to address these challenges.

SUMMARY

In one embodiment, an augmented reality system includes a light source configured to generate a virtual light beam. The system also includes a light guiding optical element having an entry portion, an exit portion, and a surface having a diverter disposed adjacent thereto. The light source and the light guiding optical element are configured such that the virtual light beam enters the light guiding optical element through the entry portion, propagates through the light guiding optical element by at least partially reflecting off of the surface, and exits the light guiding optical element through the exit portion. The light guiding optical element is transparent to a first real-world light beam. The diverter is configured to modify a light path of a second real-world light beam at the surface.

In one or more embodiments, the diverter is configured to reflect the second real-world light beam. The diverter may be configured to refract or diffract the second real-world light beam.

In one or more embodiments, the diverter is wavelength selective. The light source may be configured such that the virtual light beam has a wavelength corresponding to a wavelength for which the diverter is at least partially reflective.

In one or more embodiments, the diverter is angle of incidence selective. The light source and the light guiding optical element may be configured such that the virtual light beam reflects off of the surface at an angle of incidence corresponding to an angle of incidence at which the diverter is reflective.

In one or more embodiments, the diverter is polarization selective. The virtual light beam may be a polarization corresponding to a polarization for which the diverter is reflective.

In one or more embodiments, the diverter is configured to reduce a critical angle of the surface compared to the surface without the diverter. The diverter may be a thin film dichroic diverter.

In one or more embodiments, the light guiding optical element also has a second surface, where the light source and the light guiding optical element are configured such that the virtual light beam propagates through the light guiding optical element by at least partially reflecting off of the surface and the second surface. The light guiding optical element may also have a second diverter disposed adjacent the second surface, where the second diverter is configured to modify a light path of a third real-world light beam at the surface.

In one or more embodiments, the diverter is a coating. The coating may be a dynamic coating. The dynamic coating may include a dielectric material, a liquid crystal, or lithium niobate. The diverter may include a metasurface material. The diverter may be a waveguide outcoupler.

In another embodiment, an augmented reality system includes a light source configured to generate a virtual light beam. The system also includes a light guiding optical element having an entry portion, an exit portion, a first surface, and a second surface. The first surface has a first diverter disposed adjacent thereto. The second surface has a second diverter disposed adjacent thereto. The light source and the light guiding optical element are configured such that the virtual light beam enters the light guiding optical element through the entry portion, propagates through the light guiding optical element by at least partially reflecting off of both the first and second surfaces, and exits the light guiding optical element through the exit portion. The light guiding optical element is transparent to a first real-world light beam. The first and second diverters are each configured to modify reflection of a second real-world light beam at the respective first and second surfaces.

In one or more embodiments, the first and second diverters are each configured to reflect the second real-world light beam.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 8 is an edge-on schematic view of a coated surface of a light-guiding optical element of an augmented reality system according to one embodiment.

FIG. 9 is an edge-on schematic view of two coated surfaces of a light-guiding optical element of an augmented reality system according to another embodiment.

DETAILED DESCRIPTION

Figure 1:
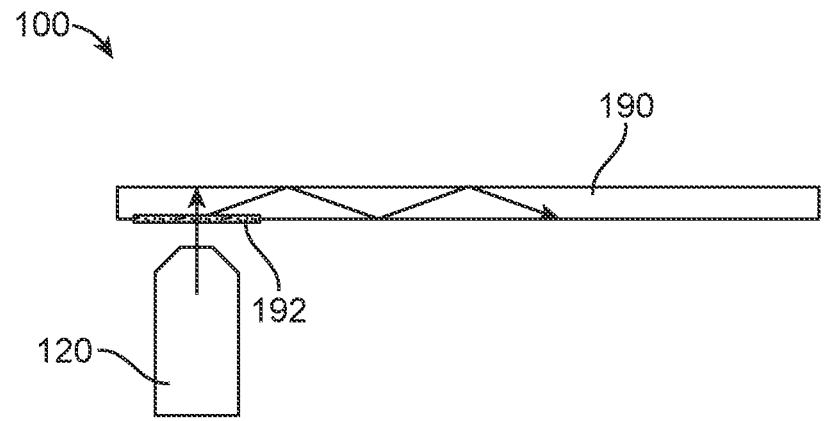
FIGS. 1 to 3 are detailed schematic views of various augmented reality systems.

Various embodiments of the invention are directed to systems, methods, and articles of manufacture for implementing optical systems in a single embodiment or in multiple embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The optical systems may be implemented independently of AR systems, but many embodiments below are described in relation to AR systems for illustrative purposes only.

Summary of Problem and Solution

One type of optical system for generating virtual images at various depths while allowing real-world light to pass through includes at least partially transparent light-guiding optical elements (e.g., prisms including diffractive optical elements). However, these light-guiding optical elements can unintentionally in-couple real-world light from real-world objects. The accidentally in-coupled real-world light can out-couple from the light-guiding optical elements toward a user's eyes. The out-coupled real-world light exits the light-guiding optical element with a changed angle, thereby generating artifacts in the AR scenario such as a "ghost" image or artifact of the sun appearing below the horizon. Not only does the ghost artifact disrupt the effect of the AR scenario with an incongruous and out of context image, it can also cause user discomfort from the vergence-accommodation conflict.

The following disclosure describes various embodiments of systems and methods for creating 3D perception using multiple-plane focus optical elements that address this problem, by applying one or more coatings to one or more surfaces of the light-guiding optical elements. In particular, the coatings can be angularly selective such that the coated optical elements are substantially transparent to real-world light with a low angle of incidence ("AOI"; e.g., near 90 degrees from the surface of the optical element). At the same time, the coating renders the coated optical elements highly reflective to oblique real-world light with a high AOI (e.g., nearly parallel to the surface of the optical element; about 170 degrees). As such, the coated light-guiding optical element can be substantially transparent to real-world light in the field of view, while minimizing unintended in-coupling of real-world light and the ghost artifacts associated therewith.

Illustrative Augmented Reality System(s)

Before describing the details of embodiments of the coated light-guiding optical elements, this disclosure will now provide a brief description of illustrative AR systems.

One possible approach to implementing an AR system uses a plurality of volume phase holograms, surface-relief holograms, or light-guiding optical elements that are embedded with depth plane information to generate images that appear to originate from respective depth planes. In other words, a diffraction pattern, or diffractive optical element ("DOE") may be embedded within or imprinted upon a light-guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2 N or 3 N stacked LOEs may be used to generate RGB colored images at N depth planes.

In order to present 3D virtual content to the user, the augmented reality (AR) system projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 4:
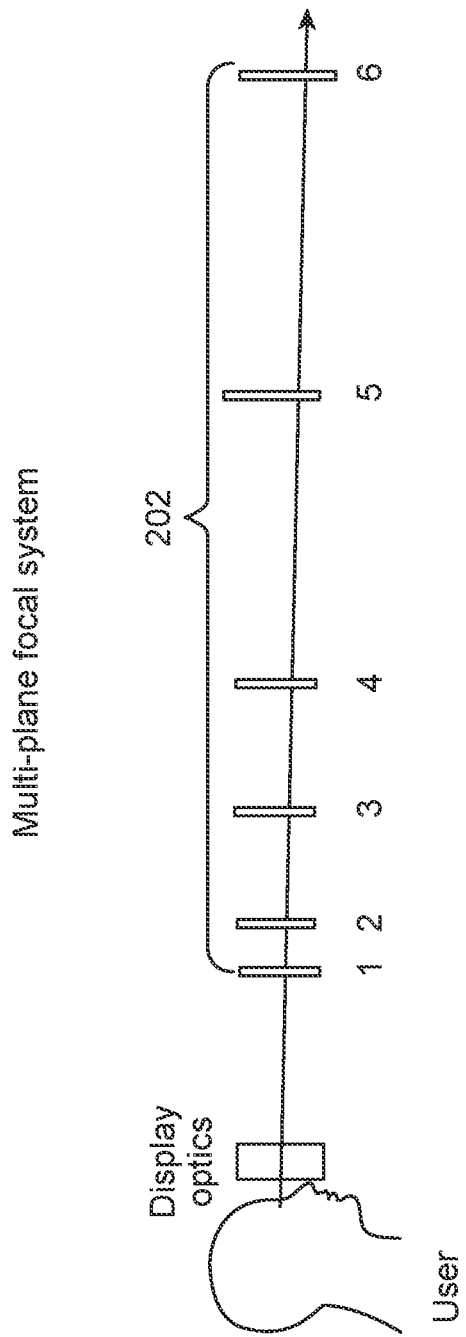
FIG. 4 is a diagram depicting the focal planes of an augmented reality system.

Multiple-plane focus systems create a perception of variable depth by projecting images on some or all of a plurality of depth planes located at respective fixed distances in the Z direction from the user's eye. Referring now to FIG. 4, it should be appreciated that multiple-plane focus systems typically display frames at fixed depth planes 202 (e.g., the six depth planes 202 shown in FIG. 4). Although AR systems can include any number of depth planes 202, one exemplary multiple-plane focus system has six fixed depth planes 202 in the Z direction. In generating virtual content one or more of the six depth planes 202, 3D perception is created such that the user perceives one or more virtual objects at varying distances from the user's eye. Given that the human eye is more sensitive to objects that are closer in distance than objects that appear to be far away, more depth planes 202 are generated closer to the eye, as shown in FIG. 4. In other embodiments, the depth planes 202 may be placed at equal distances away from each other.

Depth plane positions 202 are typically measured in diopters, which is a unit of optical power equal to the inverse of the focal length measured in meters. For example, in one embodiment, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 202 at other distances/diopters. Thus, in generating virtual content at strategically placed depth planes 202, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3D view of the coffee cup.

In one embodiment, the AR system may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE 1090 retaining collimation of light (e.g., depth plane 6 from FIG. 4) may be utilized. Then an image of a closer tree branch may be injected at time 2 and an LOE 1090 configured to create an image appearing to originate from a depth plane 10 meters away (e.g., depth plane 5 from FIG. 4) may be utilized; then an image of a pen may be injected at time 3 and an LOE 1090 configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

AR systems are required to project images (i.e., by diverging or converging light beams) that appear to originate from various locations along the Z axis (i.e., depth planes) to generate images for a 3D experience. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

FIG. 1 depicts a basic optical system 100 for projecting images at a single depth plane. The system 100 includes a light source 120 and an LOE 190 having a diffractive optical element (not shown) and an in-coupling grating 192 (ICG) associated therewith. The diffractive optical elements may be of any type, including volumetric or surface relief. In one embodiment, the ICG 192 is a reflection-mode aluminized portion of the LOE 190. In another embodiment, the ICG 192 is a transmissive diffractive portion of the LOE 190. When the system 100 is in use, the light beam from the light source 120 enters the LOE 190 via the ICG 192 and propagates along the LOE 190 by substantially total internal reflection ("TIR") for display to an eye of a user. It is understood that although only one beam is illustrated in FIG. 1, a multitude of beams may enter LOE 190 from a wide range of angles through the same ICG 192. A light beam "entering" or being "admitted" into an LOE includes, but is not limited to, the light beam interacting with the LOE so as to propagate along the LOE by substantially TIR. The system 100 depicted in FIG. 1 can include various light sources 120 (e.g., LEDs, OLEDs, lasers, and masked broad-area/broad-band emitters). In other embodiments, light from the light source 120 may be delivered to the LOE 190 via fiber optic cables (not shown).

Figure 2:
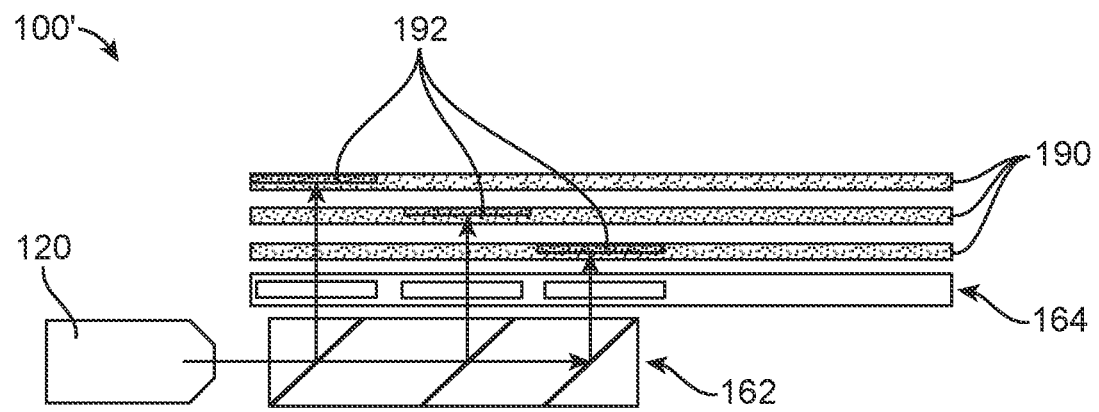

FIG. 2 depicts another optical system 100', which includes a light source 120, three LOEs 190, and three respective in-coupling gratings 192. The optical system 100' also includes three beam-splitters or dichroic mirrors 162 (to direct light to the respective LOEs) and three LC shutters 164 (to control when the LOEs are illuminated). When the system 100' is in use, the light beam from the light source 120 is split into three sub-beams/beamlets by the three-beam-splitters 162. The three beam-splitters also redirect the beamlets toward respective in-coupling gratings 192. After the beamlets enter the LOEs 190 through the respective in-coupling gratings 192, they propagate along the LOEs 190 by substantially TIR where they interact with additional optical structures resulting in display to an eye of a user. The surface of in-coupling gratings 192 on the far side of the optical path can be coated with an opaque material (e.g., aluminum) to prevent light from passing through the in-coupling gratings 192 to the next LOE 190. In one embodiment the beam-splitters 162 can be combined with wavelength filters to generate red, green and blue beamlets. In such an embodiment, three LOEs 190 are required to display a color image at a single depth plane. In another embodiment, LOEs 190 may each present a portion of a larger, single depth-plane image area angularly displaced laterally within the user's field of view, either of like colors, or different colors ("tiled field of view").

Figure 3:
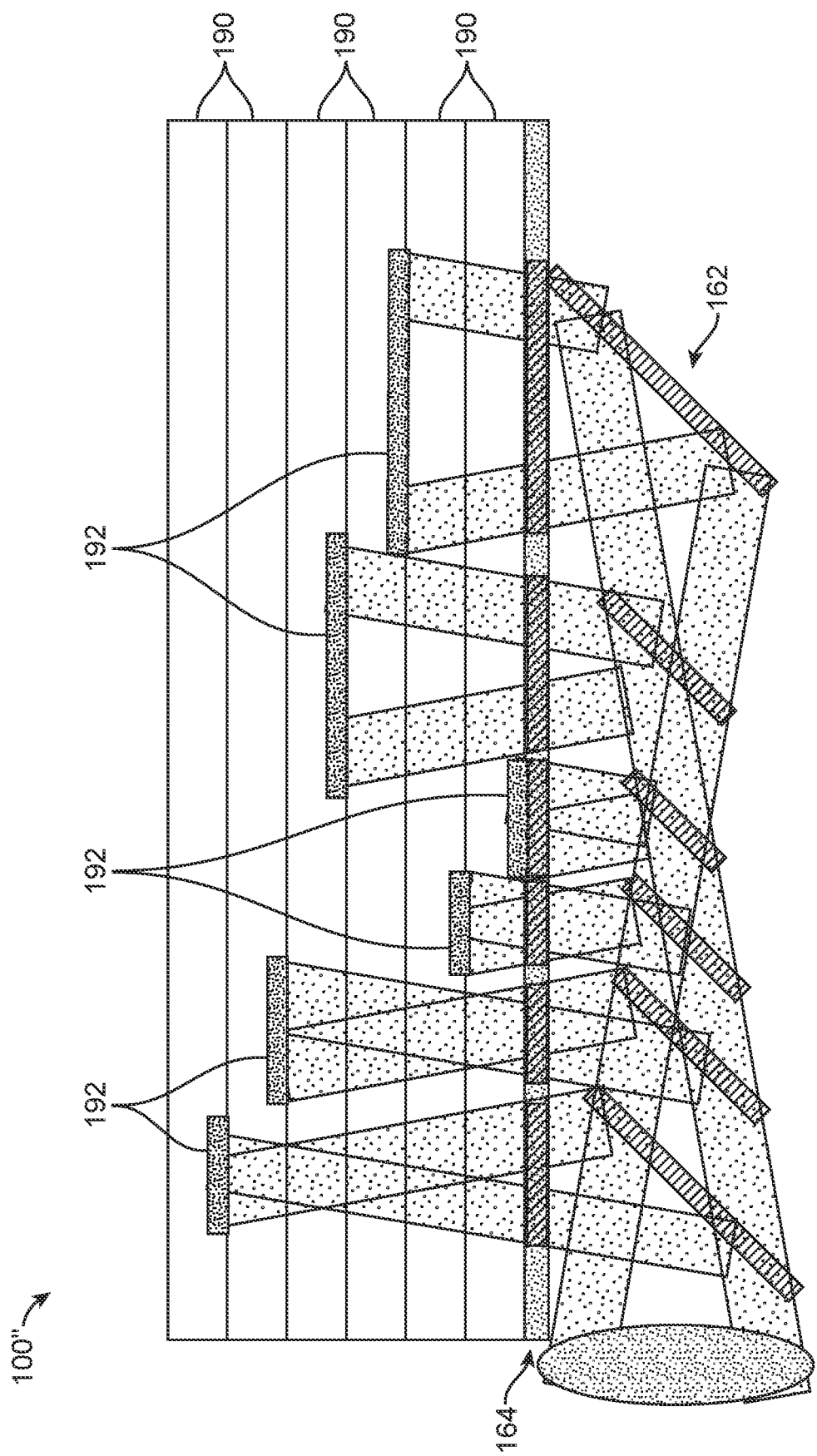

FIG. 3 depicts still another optical system 100", having six beam-splitters 162, six LC shutters 164 and six LOEs 190, each having a respective ICG 192. As explained above during the discussion of FIG. 2, three LOEs 190 are required to display a color image at a single depth plane. Therefore, the six LOEs 190 of this system 100" are able to display color images at two depth planes.

Figure 5:
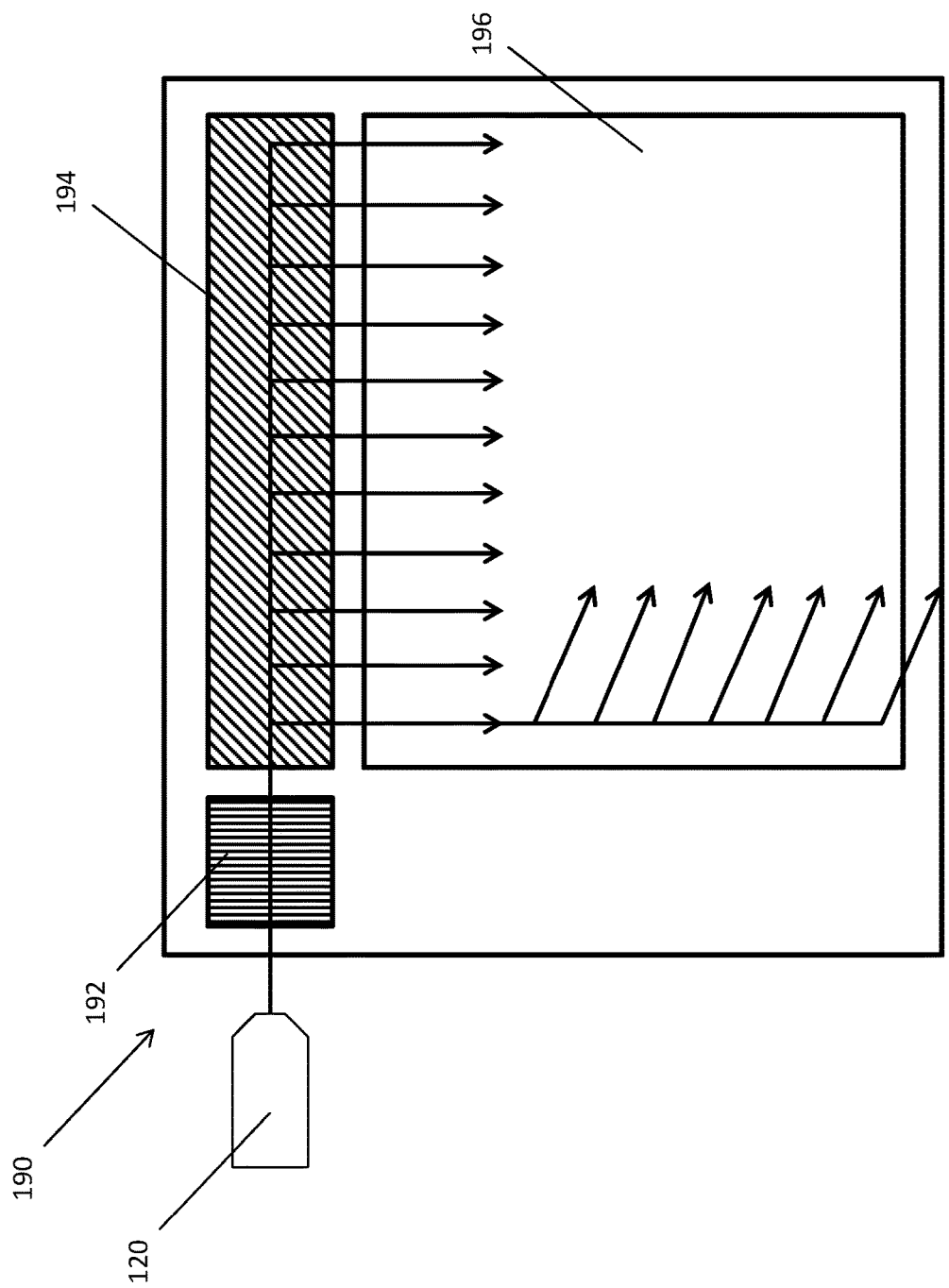
FIG. 5 is a detailed schematic view of a light-guiding optical element of an augmented reality system.

FIG. 5 depicts a LOE 190 having an ICG 192, an orthogonal pupil expander 194 ("OPE"), and an exit pupil expander 196 ("EPE").

As shown in FIGS. 1-4, as the number of depth planes, field tiles, or colors generated increases (e.g., with increased AR scenario quality), the numbers of LOEs 190 and ICGs 192 increases. For example, a single RGB color depth plane requires at least three LOEs 190 with three ICGs 192. As a result, the opportunity for inadvertent in-coupling of real-world light at these optical elements also increases. Further, real-world light can be in-coupled all along an LOE 190, including at out-coupling gratings (not shown). Thus the increasing number of optical elements required to generate an acceptable AR scenario exacerbates the problem of ghost artifacts from in-coupled real-world light.

Pupil Expanders

The LOEs 190 discussed above can additionally function as exit pupil expanders 196 ("EPE") to increase the numerical aperture of a light source 120, thereby increasing the resolution of the system 100. Since the light source 120 produces light of a small diameter/spot size, the EPE 196 expands the apparent size of the pupil of light exiting from the LOE 190 to increase the system resolution. In other embodiments of the AR system 100, the system may further comprise an orthogonal pupil expander 194 ("OPE") in addition to an EPE 196 to expand the light in both the X and Y directions. More details about the EPEs 196 and OPEs 194 are described in the above-referenced U.S. Utility patent application Ser. No. 14/555,585 and U.S. Utility patent application Ser. No. 14/726,424, the contents of which have been previously incorporated by reference.

FIG. 5 depicts an LOE 190 having an ICG 192, an OPE 194 and an EPE 196. FIG. 5 depicts the LOE 190 from a top view that is similar to the view from a user's eyes. The ICG 192, OPE 194, and EPE 196 may be any type of DOE, including volumetric or surface relief.

The ICG 192 is a DOE (e.g., a linear grating) that is configured to admit light from a light source 120 for propagation by TIR. In the embodiment depicted in FIG. 5, the light source 120 is disposed to the side of the LOE 190.

The OPE 194 is a DOE (e.g., a linear grating) that is slanted in the lateral plane (i.e., perpendicular to the light path) such that a light beam that is propagating through the system 100 will be deflected by 90 degrees laterally. The OPE 194 is also partially transparent and partially reflective along the light path, so that the light beam partially passes through the OPE 194 to form multiple (e.g., 11) beamlets. In one embodiment, the light path is along an X axis, and the OPE 194 configured to bend the beamlets to the Y axis.

The EPE 196 is a DOE (e.g., a linear grating) that is slanted in the axial plane (i.e., parallel to the light path or the Y direction) such that the beamlets that are propagating through the system 100 will be deflected by 90 degrees axially. The EPE 196 is also partially transparent and partially reflective along the light path (the Y axis), so that the beamlets partially pass through the EPE 196 to form multiple (e.g., 7) beamlets. The EPE 196 is also slated in a Z direction to direction portions of the propagating beamlets toward a user's eye.

The OPE 194 and the EPE 196 are both also at least partially transparent along the Z axis to allow real-world light (e.g., reflecting off real-world objects) to pass through the OPE 194 and the EPE 196 in the Z direction to reach the user's eyes. In some embodiments, the ICG 192 is at least partially transparent along the Z axis also at least partially transparent along the Z axis to admit real-world light. However, when the ICG 192, OPE 194, or the EPE 196 are transmissive diffractive portions of the LOE 190, they may unintentionally in-couple real-world light may into the LOE 190. As described above this unintentionally in-coupled real-world light may be out-coupled into the eyes of the user forming ghost artifacts.

The Ghost Artifact Problem

Figure 6:
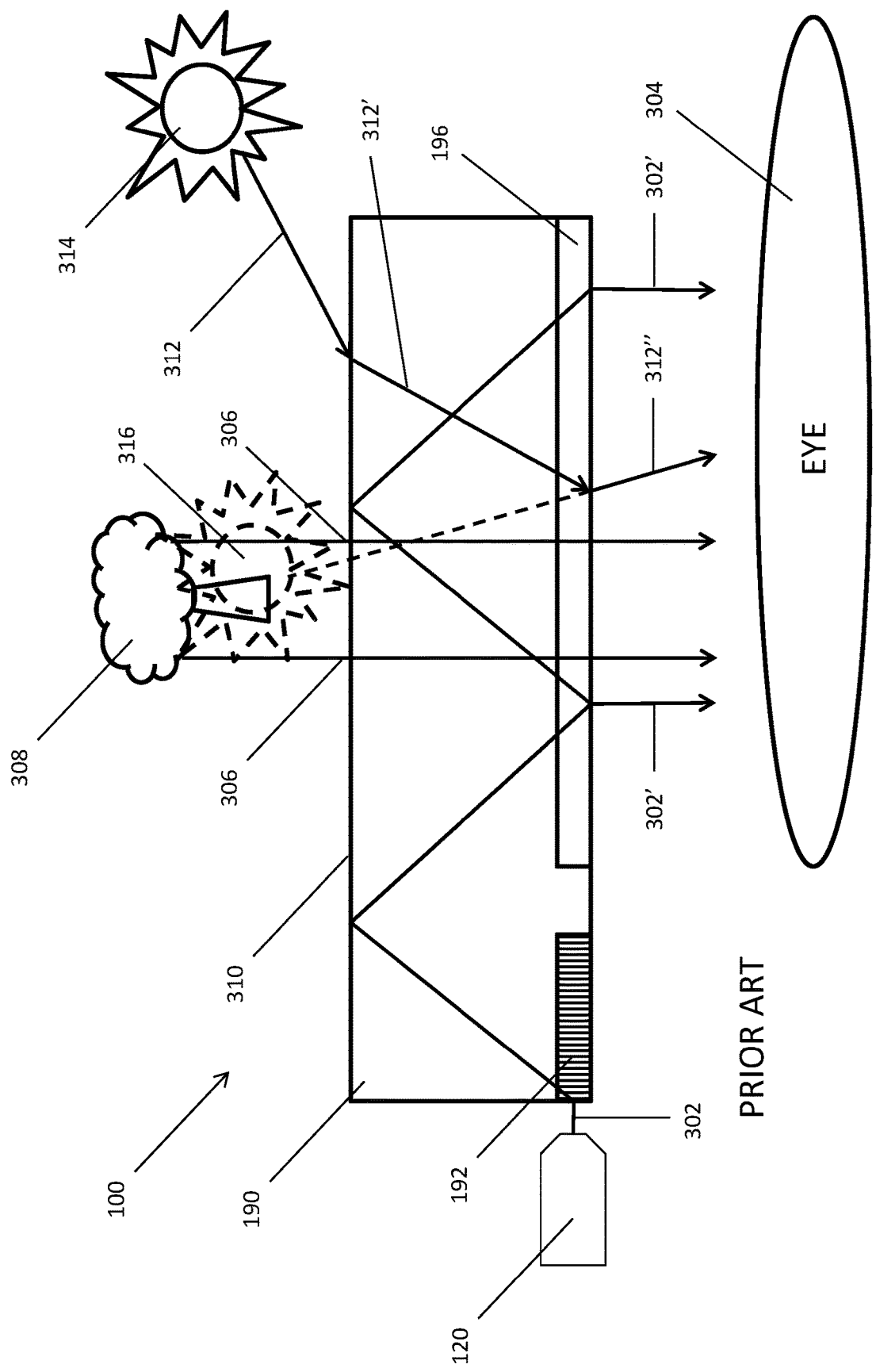
FIG. 6 is an edge-on schematic view of a prior art light-guiding optical element of an augmented reality system.

FIG. 6 is an edge-on schematic view of a prior art AR system 100 having an LOE 190. The LOE 190 is similar to the one depicted in FIG. 5, but only the ICG 192 and the EPE 196 are depicted FIG. 6, with the OPE 194 omitted for clarity. Several exemplary light beams from various sources are illustrated to demonstrate the ghost artifact problem mentioned above. A virtual light beam 302 generated by a light source 120 is in-coupled into the LOE 190 by the ICG 192. The virtual light beam 302 carries information for a virtual object generated by the AR system 100.

The virtual light beam 302 is propagated through LOE 190 by TIR, and partially exits each time it impinges on the EPE 196. In FIG. 6, the virtual light beam 302 impinges two locations on the EPE 196. The exiting virtual light beamlets 302' address a user's eye 304 at an angle determined by the AR system 100. The virtual light beamlets 302' depicted in FIG. 6 are substantially parallel to each other. The virtual light beamlets 302' will therefore render an image (e.g., a distant flock of birds; not shown) that appears to originate from near infinity. The virtual light beamlets 302' can address a user's eye 304 at a wide range of angles relative to each other to render images that appear to originate from a wide range of distances from the user's eye.

The LOE 190 is also transparent to real-world light beams 306, such as those reflecting off of real-world objects 308 (e.g., a distant tree). Because the tree 308 depicted in FIG. 6 is distant from user's eye 304, the real-world light beams 302 are substantially parallel to each other. The real-world light beams 306 pass through the LOE 190 without noticeably changing trajectory, because the LOE 190 is transparent to light impinging on the LOE 190 at a relatively low AOI (e.g., about 90 degrees from an exterior surface 310 of the LOE 190). Real-world objects 308 at distances closer to the user's eye 302 will diverge from each other, but will still substantially pass through the LOE 190.

The problem is that this prior art LOE 190 also in-couples (by refraction) high AOI real-world light beams 312 that address the LOE 190 at a high AOI (e.g., about parallel to the surface of the LOE 190; about 170 degrees). For instance, the high AOI object 314 (i.e., the sun) depicted in FIG. 6 is at a high AOI relative to the LOE 190. While the sun 314 is depicted to the right of the LOE 190, the sun 314 can be, and typically is, high in the sky above the LOE 190.

The sun 314 is a high AOI object 314 that can generate ghost artifacts because it is also bright. Other objects 314 that can generate ghost artifacts include light sources (flashlights, lamps, headlights, etc.) that happen to impinge on an LOE 190 at a high AOI.

As shown in FIG. 6, the high AOI real-world beam 312 can be in-coupled into the LOE 190 at an exterior surface 310 of the LOE 190. Due to the index of refraction of the material from which the LOE 190 is made, the in-coupled high AOI real-world beam 312' changes trajectory from the high AOI real-world beam 312. Finally, when the in-coupled high AOI real-world beam 312' impinges on the EPE 196, it exits the LOE 190 as an exiting high AOI real-world beam 312" with a further changed trajectory. As shown in FIG. 6, the exiting high AOI real-world beam 312" renders a ghost image/artifact 316 of the sun that appears to originate from a different location in the field of view than the actual location of the sun 314. In FIG. 6, the ghost image/artifact 316 appears to originate in the same location as the tree 308. The juxtaposition of the unintended ghost image/artifact 316 of the sun 314 over the real-world tree 308 can disrupt the intended effect of the AR scenario. The appearance of unintended ghost images/artifacts 316 can also result in discomfort from vergence-accommodation conflict, because the ghost image/artifact 316 will appear with a random degree of focus.

Because AR systems 100 require some degree of transparency to real-world light beams 306, their LOEs 190 have the problem of unintended in-coupling of high AOI real-world light beams 312, and the ghost artifacts generated when the in-coupled high AOI real-world beam 312' exits the LOE 190. While singles beams and beamlets are depicted in FIG. 6, it should be appreciated that this is for clarity. Each single beam or beamlet depicted in FIG. 6 represents a plurality of beams or beamlets carrying related information and having similar trajectories.

Coated Light-Guiding Optical Elements

Figure 7:
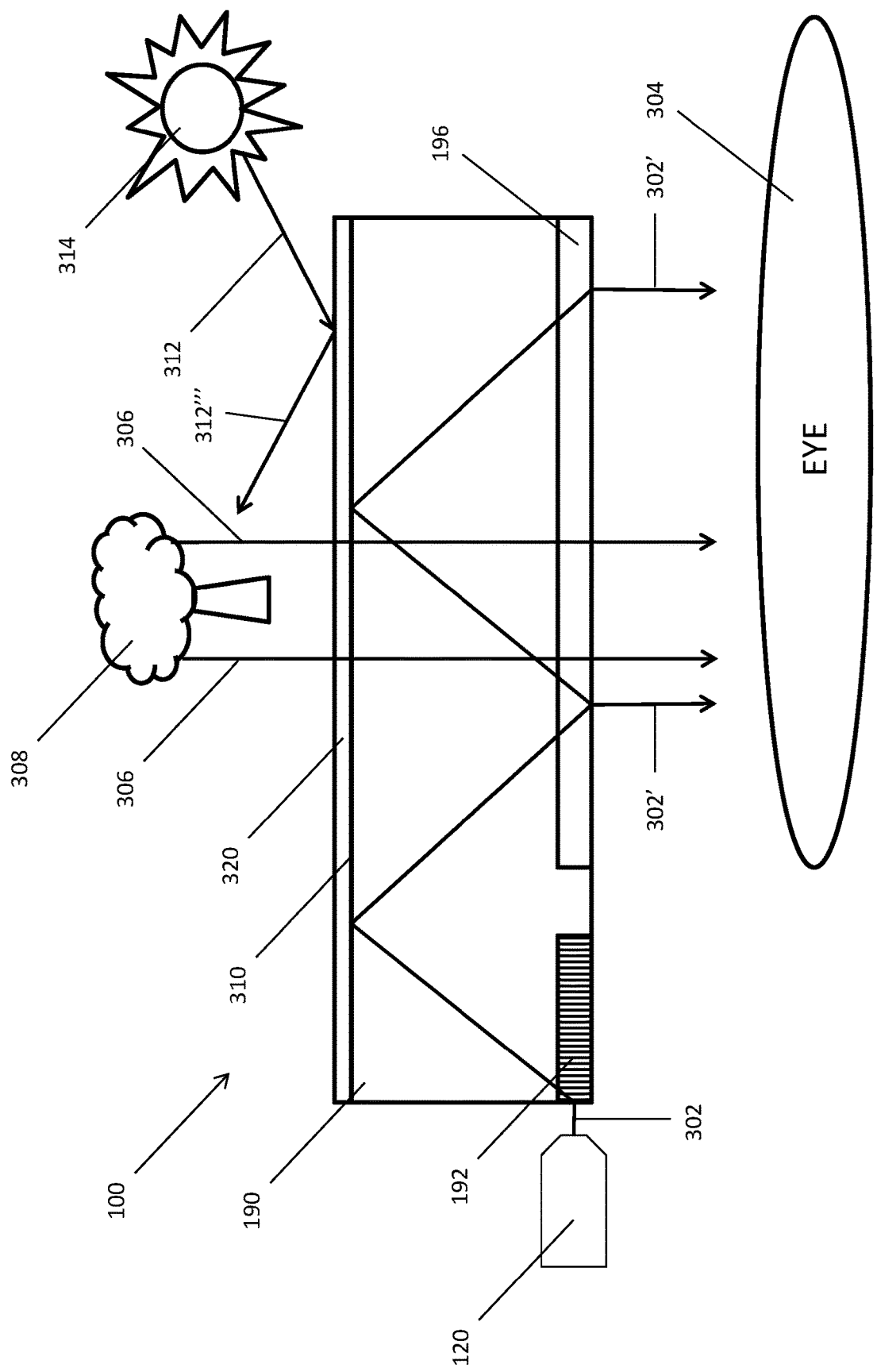
FIG. 7 is an edge-on schematic view of a light-guiding optical element of an augmented reality system according to one embodiment.

FIG. 7 is an edge-on schematic view of an AR system 100 having an LOE 190 according to one embodiment. The LOE 190 has an ICG 192, an OPE (not shown), an EPE 196, and a selectively reflective coating 320. The selectively reflective coating 320 is disposed on an external surface 310 of the LOE 190. The selectively reflective coating 320 can be configured to reflect light having a variety of characteristics, depending how the coating 320 is "tuned." In one embodiment, the coating is tuned to selectively reflect light impinging upon the coating 320 at a relatively high AOI, while allowing light impinging upon the coating 320 at a relatively low AOI to pass through the coating. The coating 320 is also tuned to allow relatively low AOI light to pass therethrough without noticeably changing the angle of trajectory thereof.

Tuning a coating 320 involves selecting the physical dimensions and chemical makeup of a coating to control its reflection characteristics. For instance, the coating 320 may include a plurality of thin layers, as depicted in FIG. 8. The entire coating 320 or one or more layers therein may include dichroic materials, or other materials with differential reflectance of light based on the light's characteristics (e.g., wavelength, AOI, and/or polarization). Layers having different reflectance characteristics can be combined to tune the coating 320.

In one embodiment, the coating 320 can be tuned to achieve target reflectance at various AOIs. Coating design software can determine a number of layers and the indices for each layer to achieve the target reflectance. Starting with a standard stack of indices and thicknesses (e.g., from a mirror designer), the software can determine a closed form solution to the structure as a function of AOI or wavelength. Increasing the number of layers in the coating 320 and/or the indices and thicknesses of those layers facilitates a more complex reflectance vs. AOI profile, including sharp cut-offs in terms of AOI and reflectance. With a single layer and a single index of material, the coating 320 can be a V-coat (i.e., anti-reflective material at one wavelength and one angle). With two layers the coating 320 can be a W-coat (i.e., anti-reflective material at two wavelengths and two angle). The coating design technique is analogous to techniques used to design biological filters for florescence microscopy with many layers and extremely sharp wavelength cut-offs. Examples of coatings 320 include dynamic coating such as dielectric coatings, liquid crystal coatings, and lithium niobate coatings.

The system 100 also includes a light source 120 configured to direct a virtual light beam 302 at the ICG 192. The virtual light beam 302 is in-coupled into the LOE 190 by the ICG 192. The virtual light beam 302 carries information for a virtual object generated by the AR system 100.

The virtual light beam 302 is propagated through LOE 190 by TIR, and partially exits each time it impinges on the EPE 196. The coating 320 is tuned to selectively reflect light with AOI greater than or equal to the critical angle of the system 100, thereby facilitating TIR. In other embodiments, the coating 320 can be tuned to reduce the critical angle of the LOE 190 to further facilitate TIR.

In FIG. 7, the virtual light beam 302 impinges two locations on the EPE 196. The exiting virtual light beamlets 302' address a user's eye 304 at an angle determined by the AR system 100. The virtual light beamlets 302' depicted in FIG. 6 are substantially parallel to each other. The virtual light beamlets 302' will therefore render an image (e.g., a distant flock of birds; not shown) that appears to originate from near infinity. The virtual light beamlets 302' can address a user's eye 304 at a wide range of angles relative to each other to render images that appear to originate from a wide range of distances from the user's eye.

The LOE 190 is also substantially transparent to real-world light beams 306, such as those reflecting off of real-world objects 308 (e.g., a distant tree). The coating 320 applied to the LOE 190 is also tuned to be substantially transparent to real-world light beams 306 with an AOI less than the critical angle of the system 100. Because the tree 308 depicted in FIG. 6 is distant from user's eye 304, the real-world light beams 302 are substantially parallel to each other. The real-world light beams 306 pass through the LOE 190 without noticeably changing trajectory, because the LOE 190 is substantially transparent to light impinging on the LOE 190 at a relatively low AOI (e.g., about 90 degrees from an exterior surface 310 of the LOE 190). Real-world objects 308 at distances closer to the user's eye 302 will diverge from each other, but will still substantially pass through the LOE 190 and the coating 320.

When a high AOI real-world light beam 312 impinges on the LOE 190 at a high AOI (e.g., about parallel to the surface of the LOE 190), the high AOI real-world light beam 312 is selectively reflected by the coating 320, and does not in-couple into the LOE 190. The coating 320 is tuned to selectively reflect the high AOI real-world light beam 312 because of its high AOI. As shown in FIG. 7, the reflected high AOI real-world beam 312''' is directed away from the LOE 190 and does not impinge upon the user's eye 304. Because the reflected high AOI real-world beam 312" does not reach the user's eye 304, no ghost artifacts are generated in the user's field of view.

In the above-described manner, the selectively reflective coating 320 reduces or eliminates ghost artifacts, while maintaining the degree of transparency to real-world light beams 306 required of AR systems 100. The coating 320 substantially prevents the LOEs 190 from in-coupling high AOI real-world light beams 312.

The coating 320 may also be tuned to be selective for characteristics of the virtual light beam 302 to promote TIR of thereof. In one embodiment, the coating 320 is tuned to reflect or reflect to a greater degree light of a certain wavelength, and the light source 120 can be configured such that the virtual light beam 302 has that certain wavelength. In another embodiment, the coating 320 is tuned to reflect or reflect to a greater degree light having a certain AOI, and the system 100 can be configured such that the virtual light beam 302 has that certain AOI. In still another embodiment, the coating 320 is tuned to reflect or reflect to a greater degree light having a certain polarization, and the system 100 can be configured such that the virtual light beam 302 has that certain polarization. In yet another embodiment, the coating 320 is tuned to reduce a critical angle of the exterior surface 310. In still another embodiment, the coating 320 is tuned to reflect light at one or more wavelengths to which a user's eye is most sensitive (e.g., 520 nm or 532 nm "green" light), to thereby prevent unintentional in-coupling of that light.

While singles beams and beamlets are depicted in FIG. 6, it should be appreciated that this is for clarity. Each single beam or beamlet depicted in FIG. 6 represents a plurality of beams or beamlets carrying related information and having similar trajectories.

While the coating 320 may reduce the field of view by reflecting real-world high AOI light, reduction or elimination of ghost artifacts is a benefit that can outweigh the cost of a reduced field of view. Further, the coating 320 may be tuned to reduce ghost artifacts while retaining an acceptable field of view.

While the embodiments described herein include a single coated surface 310, other embodiments have two or more coated surfaces 310 to reduce unintended in-coupling of high AOI real-world light beams 312 at all of the coated surfaces 310. In embodiments, where a single surface 310 is coated, a front facing surface 310 is preferably coated, because the front facing surface 310 will be most exposed to high AOI real-world light beams 312.

While the embodiments described herein include a coated exterior surface 310, the coating 320 or the structural and chemical equivalent thereof can be incorporated into the LOE 190. In some embodiments, the coating 320 or the structural and chemical equivalent thereof is disposed at an interior surface of the LOE 190. In other embodiments, the coating 320 or the structural and chemical equivalent thereof is disposed in the middle of the LOE 190. Embodiments include all possible positions as long as the coating 320 or the structural and chemical equivalent thereof reflects high AOI real-world light beams 312 and prevent them from in-coupling into the LOE 190.

While the embodiments described herein include a coating 320 on one exterior surface 310 of an LOE 190, other embodiments include a plurality of coatings on a plurality of surfaces. For instance, the optical system 100 depicted in FIG. 9 includes a first coating 320 on a first exterior surface 310 of an LOE 190, and a second coating 322' on a second exterior surface 310' of the LOE 190. This second coating 322' can prevent in-coupling of select real-world light beams (e.g., high AOI) from a second direction into the LOE 190.

While the embodiments described herein include at least partially transparent coatings 320, other embodiments may include other "diverters" for changing a light path of select real-world light beams (e.g., high AOI) such that the real-world light beams are not in-coupled into an LOE. Examples of diverters include various "lossy substances," such as metasurface materials, and waveguide outcouplers.

While the embodiments described herein include diverters (e.g., coatings) that reflect select real-world light beams, other embodiments include diverters that change a light path of select real-world light beams. Such diverters may refract or diffract the select real-world light beams.

The above-described AR systems are provided as examples of various optical systems that can benefit from more selectively reflective optical elements. Accordingly, use of the optical systems described herein is not limited to the disclosed AR systems, but rather applicable to any optical system.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. An augmented reality system, comprising:
   a light source configured to generate a virtual light beam; and
   a planar waveguide having an entry portion, an exit portion, and a surface having a diverter disposed adjacent thereto,
   wherein the diverter is tuned to selectively:
     prevent real-world light beams that are incident on the diverter at angles greater than or equal to a predetermined angle of incidence from reaching the surface of the planar waveguide, and
     allow real-world light beams that are incident on the diverter at angles less than the angle of incidence to pass through the diverter to the surface of the planar waveguide, and
   wherein tuning the diverter comprises selecting a physical dimension and a chemical makeup of the diverter, and
   wherein the diverter is wavelength selective.

2. The system of claim 1, wherein the diverter is configured to reflect the real-world light beams that are incident on the diverter at angles greater than or equal to the angle of incidence to prevent said real-world light beams from entering said planar waveguide through the surface of the planar waveguide.

3. The system of claim 1, wherein the diverter is further configured to refract or diffract further real-world light beams.

4. The system of claim 1, wherein the light source is configured such that the virtual light beam has a wavelength corresponding to a wavelength for which the diverter is at least partially reflective.

5. An augmented reality system, comprising:
a light source configured to generate a virtual light beam; and
a planar waveguide having an entry portion, an exit portion, and a surface having a diverter disposed adjacent thereto,
wherein the diverter is tuned to selectively:
prevent real-world light beams that are incident on the diverter at angles greater than or equal to a predetermined angle of incidence from reaching the surface of the planar waveguide, and
allow real-world light beams that are incident on the diverter at angles less than the angle of incidence to pass through the diverter to the surface of the planar waveguide, and
wherein tuning the diverter comprises selecting a physical dimension and a chemical makeup of the diverter, and
wherein the diverter is polarization selective.

6. The system of claim 5, wherein the virtual light beam has a polarization corresponding to a polarization for which the diverter is reflective.

7. The system of claim 1, wherein the diverter is configured to reduce a critical angle of the surface of the planar waveguide compared to the surface of the planar waveguide without the diverter.

8. The system of claim 1, the planar waveguide also having a second surface, wherein the light source and the planar waveguide are configured such that the virtual light beam propagates through the planar waveguide by at least partially reflecting off of the surface of the planar waveguide and the second surface of the planar waveguide.

9. The system of claim 8, the planar waveguide also having a second diverter disposed adjacent the second surface, wherein the second diverter is configured to selectively:
prevent real-world light beams that are incident on the diverter at angles greater than or equal to the angle of incidence from reaching the second surface of the planar waveguide, and
allow real-world light beams that are incident on the diverter at angles less than the angle of incidence to pass through the second diverter to the second surface of the planar waveguide.

10. The system of claim 1, wherein the diverter is a coating.

11. The system of claim 10, wherein the coating is a selectively reflective coating.

12. The system of claim 1, wherein the diverter is a dynamic coating comprising a liquid crystal or lithium niobate.

13. The system of claim 1, wherein the diverter comprises a metasurface material.

14. The system of claim 1, wherein the diverter is a waveguide outcoupler.

15. The system of claim 1, wherein the diverter includes a plurality of thin layers having different reflectance characteristics.

16. The system of claim 15, further comprising an in-coupling grating and orthogonal pupil expander.

17. The system of claim 1, wherein the diverter is a thin film dichroic diverter.

18. The system of claim 1, wherein the planar waveguide has a second surface having a second diverter disposed adjacent thereto, and
wherein the second diverter is tuned by selecting a physical dimension and a chemical makeup of the diverter to selectively:
prevent real-world light beams that are incident on the second diverter at angles greater than or equal to a predetermined angle of incidence from reaching the respective second surface of the planar waveguide, and
allow real-world light beams that are incident on the second diverter at angles less than the angle of incidence to pass through the second surface of the planar waveguide.

19. An augmented reality system, comprising:
a light source configured to generate a virtual light beam; and
a planar waveguide having an entry portion, an exit portion, and a surface having a diverter disposed adjacent thereto,
wherein the diverter is tuned to selectively:
prevent real-world light beams that are incident on the diverter at angles greater than or equal to a predetermined angle of incidence from reaching the surface of the planar waveguide, and
allow real-world light beams that are incident on the diverter at angles less than the angle of incidence to pass through the diverter to the surface of the planar waveguide, such that artifacts from real world objects at respective high angles of incidence relative to the diverter are reduced, and
wherein the diverter comprises:
a first layer tuned to reflect light having a first wavelength and a first angle of incidence higher than or equal to a first predetermined angle of incidence; and
a second layer tuned to reflect light having a second wavelength and a second angle of incidence higher than or equal to a second predetermined angle of incidence.

* * * * *